(12) United States Patent
Dai et al.

(10) Patent No.: US 10,412,635 B2
(45) Date of Patent: Sep. 10, 2019

(54) RESOURCE USE METHOD, DEVICE AND SYSTEM

(71) Applicant: ZTE Corporation, Shenzhen, Guangdong (CN)

(72) Inventors: Bo Dai, Shenzhen (CN); Chunli Liang, Shenzhen (CN); Weiwei Yang, Shenzhen (CN); Yajun Zhao, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/574,463

(22) PCT Filed: Feb. 17, 2016

(86) PCT No.: PCT/CN2016/073951
§ 371 (c)(1),
(2) Date: Nov. 15, 2017

(87) PCT Pub. No.: WO2016/184190
PCT Pub. Date: Nov. 24, 2016

(65) Prior Publication Data
US 2018/0132137 A1    May 10, 2018

(30) Foreign Application Priority Data
May 15, 2015 (CN) .......................... 2015 1 0250595

(51) Int. Cl.
*H04W 28/18* (2009.01)
*H04W 16/14* (2009.01)
(Continued)

(52) U.S. Cl.
CPC ......... *H04W 28/18* (2013.01); *H04J 11/0069* (2013.01); *H04L 1/0006* (2013.01);
(Continued)

(58) Field of Classification Search
CPC ..... H04W 28/18; H04W 28/06; H04W 16/14; H04W 72/042; H04L 1/08; H04L 5/0064;
(Continued)

(56) References Cited

U.S. PATENT DOCUMENTS 9,204,451 B2   12/2015   Porat
9,215,715 B2   12/2015   Liu et al.
(Continued)

FOREIGN PATENT DOCUMENTS

CN   101594346 A   12/2009
CN   102232307 A   11/2011
(Continued)

OTHER PUBLICATIONS

International Search Report in international application No. PCT/CN2016/073951, dated May 11, 2016.
(Continued)

*Primary Examiner* — Chirag G Shah
*Assistant Examiner* — Joshua Smith
(74) *Attorney, Agent, or Firm* — McDonald Hopkins LLC

(57) ABSTRACT

The present invention provides a resource use method, device and system. The method comprises: a transmission node dynamically changes, according to information detected on a current carrier the size of a resource corresponding to the carrier, and uses the changed carrier to perform data transmission. The present invention solves the problem of lowness of spectrum resource utilization rate, and increases the spectrum utilization rate.

20 Claims, 4 Drawing Sheets

(51) Int. Cl.
*H04J 11/00* (2006.01)
*H04L 1/00* (2006.01)
*H04W 28/06* (2009.01)
*H04L 5/00* (2006.01)
*H04L 1/08* (2006.01)
*H04J 13/00* (2011.01)
*H04L 27/26* (2006.01)
*H04W 72/04* (2009.01)

(52) U.S. Cl.
CPC .............. *H04L 1/0025* (2013.01); *H04L 1/08* (2013.01); *H04L 5/0044* (2013.01); *H04L 5/0064* (2013.01); *H04W 16/14* (2013.01); *H04W 28/06* (2013.01); *H04J 13/0062* (2013.01); *H04L 27/2613* (2013.01); *H04W 72/042* (2013.01)

(58) Field of Classification Search
CPC ... H04L 5/0044; H04L 1/0006; H04L 1/0025; H04L 27/2613; H04J 11/0069; H04J 13/0062
See application file for complete search history.

(56) References Cited

U.S. PATENT DOCUMENTS

| | | | |
|---|---|---|---|
| 2010/0254268 A1* | 10/2010 | Kim | H04W 36/385 370/241 |
| 2011/0110357 A1* | 5/2011 | Chung | H04W 48/08 370/344 |
| 2012/0165056 A1* | 6/2012 | Kim | H04W 16/14 455/509 |
| 2014/0120975 A1 | 5/2014 | Liu et al. | |
| 2014/0254510 A1 | 9/2014 | Porat | |
| 2014/0314007 A1* | 10/2014 | Chen | H04W 72/042 370/329 |
| 2015/0043391 A1* | 2/2015 | Yin | H04L 5/0092 370/280 |
| 2015/0043523 A1 | 2/2015 | Luo et al. | |
| 2016/0081118 A1 | 3/2016 | Porat | |
| 2016/0205680 A1* | 7/2016 | Nguyen | H04W 72/0446 370/280 |

FOREIGN PATENT DOCUMENTS

| | | |
|---|---|---|
| CN | 103533552 A | 1/2014 |
| CN | 104038950 A | 9/2014 |
| CN | 104333873 A | 2/2015 |
| WO | 2015023538 A1 | 2/2015 |

OTHER PUBLICATIONS

English Translation of the Written Opinion of the International Search Authority in international application No. PCT/CN2016/073951, dated May 11, 2016.

* cited by examiner

RESOURCE USE METHOD, DEVICE AND SYSTEM

TECHNICAL FIELD

The disclosure relates to the field of communications, and particularly to a resource use method, device and system.

BACKGROUND

Long Term Evolution-Unlicensed (LTE-U) indicates that LTE is deployed in an unlicensed carrier, thereby meeting an increasing capacity requirement of an LTE system and improving utilization efficiency of an unlicensed spectrum, and may be an important evolution direction of LTE and wireless communication in future. When LTE-U is designed, it is necessary to consider how the LTE-U system can fairly and friendlily compete for an unlicensed carrier for data transmission with a different system such as Wireless Fidelity (WiFi) and radar, or with the same LTE-U system, and it is also necessary to retain technical characteristics of LTE without influence as much as possible. According to a statement of a 3rd Generation Partnership Project (3GPP) standard conference, an LTE-U system may also be called as an LTE Licensed Assisted Access (LAA) system.

In a related technology, LTE supports six system bandwidths, i.e., 1.4 MHz, 3 MHz, 5 MHz, 10 MHz, 15 MHz and 20 MHz, a specific system bandwidth configuration is determined according to bandwidth unified network planning allocated by operators, and is not changed frequently, indication information of the system bandwidths is carried through a physical broadcast channel, and a minimum change period of the system bandwidths is 40 ms. A basic bandwidth of 11ac and previous systems is 20 MHz, and a basic bandwidth of 11ah below 1 GHz is 1 MHz/2 MHz/4 MHz/8 MHz/16 MHz. A user may occupy 26 tones at least for 11ax, and a bandwidth of 20 MHz can be simultaneously used by 9 users at most.

In a case that LAA and WiFi compete for a resource on the same spectrum resource: if the resource is a bandwidth of 20 MHz, an LAA system notifies User Equipment (UE) to which the LAA system is belonged that a system bandwidth is 20 MHz, and if the resource is completely idle, the LAA system can use the whole 20 MHz resource. In this case, if the resource is completely occupied by WiFi, the LAA system cannot use the 20 MHz resource; if WiFi only uses a 5 MHz system bandwidth and the other 15 MHz resource is idle, based on an existing resource using manner, LAA can occupy the resource only according to a pre-configuration of the 20 MHz system bandwidth, and even though there is currently the 15 MHz resource, the LAA system still cannot use it. Therefore, the 15 MHz spectrum resource is wasted.

For the problem of low spectrum resource utilization rate in a related technology, there is yet no effective solution at present.

SUMMARY

Embodiments of the disclosure provide a resource use method, device and system, so as to at least solve the problem of low spectrum resource utilization rate in the related technology.

According to an embodiment of the disclosure, a resource use method is provided, which may include that:

a transmission node dynamically changes a size of a resource corresponding to a carrier according to information detected on the current carrier, and performs data transmission through the changed carrier.

According to another embodiment of the disclosure, a resource use method is further provided, which may include that:

UE determines an available resource of a current carrier according to received signaling or signal, and detects Downlink Control Information (DCI) and/or a full-bandwidth signal corresponding to the carrier according to the available resource.

According to another embodiment of the disclosure, a resource use device is further provided, which may be positioned in a transmission node and include:

a first detection module, configured to dynamically change a size of a resource corresponding to a carrier according to information detected on the current carrier, and a transmission module, configured to perform data transmission through the changed carrier.

According to another embodiment of the disclosure, a resource use device is further provided, which may be positioned in UE and include:

a receiving module, configured to determine an available resource of a current carrier according to received signaling or signal; and a second detection module, configured to detect DCI and/or full-bandwidth signal corresponding to the carrier according to the available resource.

According to another embodiment of the disclosure, a resource using system is further provided, which may include: a transmission node and UE, wherein the transmission node may dynamically change a size of a resource corresponding to a carrier according to information detected on the current carrier, and perform data transmission through the changed carrier;

position information of the resource corresponding to the carrier may be notified to the UE through a signal or signaling; and the UE may receive the signaling or signal, determine an available resource of the current carrier, and detect DCI and/or full-bandwidth signal corresponding to the carrier according to the available resource.

According to the embodiments of the disclosure, the transmission node dynamically changes the size of the resource corresponding to the carrier according to the information detected on the current carrier, and performs data transmission through the changed carrier, so that the problem of low spectrum resource utilization rate is solved, and a spectrum utilization rate is increased.

BRIEF DESCRIPTION OF DRAWINGS

Drawings described herein are adopted to provide a further understanding of the disclosure, and form a part of the present application. Schematic embodiments of the disclosure and descriptions of schematic embodiments are adopted to explain the disclosure and not intended to form improper limits to the disclosure, in which.

DETAILED DESCRIPTION

The disclosure will be described in detail below with reference to the drawings and in combination with the embodiments. It is important to note that the embodiments in the disclosure or characteristics in the embodiments may be combined without conflicts.

It is important to note that terms "first", "second" and the like in the specification, claims and drawings of the disclosure are adopted not to describe a specific sequence or order but to distinguish similar objects.

First Embodiment

Figure 1:
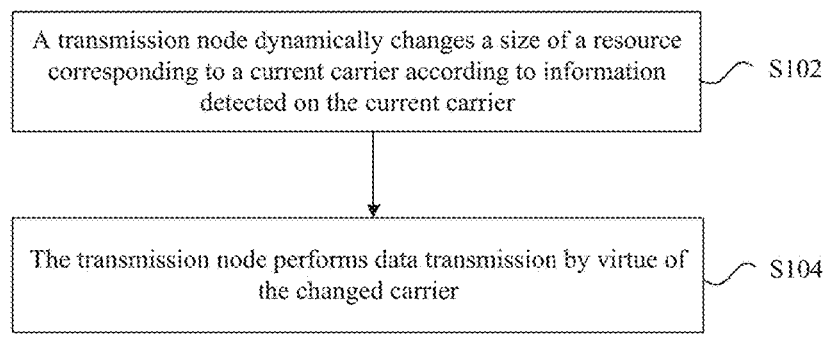
FIG. 1 is a flowchart of a resource use method according to an embodiment of the disclosure.

The first embodiment of the disclosure provides a resource use method. FIG. 1 is a flowchart of a resource use method according to an embodiment of the disclosure. As shown in FIG. 1, the flow includes the following steps.

In Step S102, a transmission node dynamically changes a size of a resource corresponding to a current carrier according to information detected on the current carrier.

In Step S104, the transmission node performs data transmission through the changed carrier.

By above steps, the transmission node dynamically changes the size of the resource corresponding to the carrier according to the information detected on the current carrier, and performs data transmission through the changed carrier, so that the problem of low spectrum resource utilization rate is solved, and a spectrum utilization rate is increased.

In the embodiment of the disclosure, the detected information includes: a using condition of the resource corresponding to the carrier, and the using condition of the resource includes: a using condition of an available resource of the carrier, wherein the using condition of the resource includes a condition in which the resource is identified by a first granularity, wherein the carrier is divided to obtain basic system bandwidths according to the first granularity, such that an available basic system bandwidth corresponding to the available resource is determined.

In the embodiment of the disclosure, the basic system bandwidths correspond to one or more second-granularity resources; and the second-granularity resources correspond to one or more detection threshold values, wherein the detection threshold values are used to detect whether the basic system bandwidths corresponding to the second-granularity resources are occupied.

In the embodiment of the disclosure, different second-granularity resources may correspond to a same detection threshold value or different detection threshold values, wherein a condition that different second-granularity resources correspond to different detection threshold values includes that: a detection threshold value of the second-granularity resource adjacent to the occupied resource of the carrier is different from a detection threshold value of a second-granularity resource not adjacent to the occupied resource.

The system bandwidths with the first granularity include: 5 MHz, 20 MHz, 15 MHz, 8 MHz, 7 MHz, 10 MHz, 1 MHz, 3 MHz, 1 MHz, 4 MHz, 1.4 MHz, 2.6 MHz and the like (not limited to these values).

A second-granularity resource is smaller than or equal to a first-granularity resource.

The detection process includes: a bandwidth Clear Channel Assessment (CCA) mode and/or a sub-band CCA mode.

Sub-band CCA is executed on sub-bands of predefined system bandwidths, and is particularly for a scenario where UE executes CCA, and thresholds corresponding to different sub-bands may be independently set. The method has the advantage of high efficiency, but is complex. In the method, basic system bandwidths correspond to multiple detection threshold values, and the sub-bands correspond to second-granularity resources.

By the abovementioned definitions about the second-granularity resources (sub-bands) and definitions about the multiple threshold values, the problem of resource unavailability caused by energy detection value unbalance may be solved. For example, for a segment of continuous resource, a resource adjacent to this resource in frequency-domain is occupied, due to adjacent-frequency out-of-band emission, an energy detection value for part of a frequency domain on the idle resource relatively is higher, but an energy detection value on a resource not adjacent to the idle resource in frequency domain is relatively lower, and then this resource may be considered to be unavailable in a conventional art, but is practically available, so that the problem of resource waste appears.

Division of the second-granularity resources includes adjacent-frequency and non-adjacent-frequency divisions, and also includes same-frequency interference condition-based granularity division and other division manners.

For bandwidth CCA, only unified CCA is performed on a predetermined system bandwidth. That is, no more detailed sub-band selection will further be performed. The method has the advantage of simplicity, but is low in efficiency. In the method, a basic system bandwidth corresponds to a detection threshold value, sub-bandwidths correspond to the basic system bandwidths, and second-granularity resources and first-granularity resources have the same size.

The detection threshold value includes one of: an average energy detection threshold value corresponding to the second-granularity resource and a minimum bandwidth energy detection threshold value corresponding to the second-granularity resource.

In the embodiment of the disclosure, position information of the resource corresponding to the carrier is notified to UE through a signal or signaling.

In the embodiment of the disclosure, the signal includes at least one of: an occupation signal corresponding to the carrier, a synchronization signal corresponding to the carrier, a discovery signal corresponding to the carrier and a starting position identification signal corresponding to the carrier.

The signaling is carried on a common channel of the carrier; or, the signaling is carried on a physical downlink control channel of a common search space of a licensed carrier, and the licensed carrier can be determined in a predefinition manner or a signaling indication manner.

In the embodiment of the disclosure, a sequence corresponding to the signal includes at least one of: a pseudo-random Quadrature Phase Shift Keying (QPSK) symbol sequence, a Zadoff-Chu (ZC) sequence, a Walsh sequence and a pseudo-random Binary Phase Shift Keying (BPSK) sequence.

The signal is repeatedly transmitted on each basic system bandwidth, wherein the basic system bandwidths are obtained by dividing the carrier according to the first granularity, and the using condition of the resource is identified with the first granularity, or, a long sequence is generated according to a maximum bandwidth, and the sequence is correspondingly acquired from the long sequence according to a position of each basic system bandwidth.

A frequency-domain position corresponding to the signal is uniformly spaced or continuous.

The sequence and frequency-domain position are selected according to a cell Identity (ID) or in a predefined manner.

In the embodiment of the disclosure, under the condition that the signaling is carried on the physical downlink control channel of the common search space of the licensed carrier, multiple unlicensed carriers corresponding to the signaling are transmitted on a same physical downlink control channel, and the physical downlink control channel corresponds to a dedicated Radio Network Temporary Identifier (RNTI) and a dedicated DCI Format;

the RNTI is used to identify the physical downlink control channel, and a bit number corresponding to the signaling is determined according to an original system bandwidth, or, the bit number is fixedly q bits, q including one of: 4 and 2;

a bit number of a DCI Format 6 corresponding to the signaling is the same as a bit number corresponding to a DCI Format 1A and a DCI Format 1C, and is positioned in the common search space;

a starting position of the signaling in the DCI Format is configured through high-layer signaling; and the common channel is repeatedly transmitted on each basic system bandwidth, wherein the basic system bandwidth is obtained by dividing the carrier according to the first granularity, and the using condition of the resource is identified with the first granularity.

In the embodiment of the disclosure, a full-bandwidth signal is sent according to the available system bandwidth corresponding to the available resource of the carrier;

the full-bandwidth signal is sent according to the original system bandwidth corresponding to the carrier;

the full-bandwidth signal is sent in a manner of repetition with the basic system bandwidth as a unit; and the full-bandwidth signal includes at least one of: a discovery signal, a synchronization signal, a measurement signal and an occupation signal.

In the embodiment of the disclosure, when a scheduling manner corresponding to the carrier is self-scheduling, a physical downlink control channel frequency-domain position is determined according to the available resource of the carrier, and DCI for carrying scheduling data corresponding to the carrier is transmitted according to the physical downlink control channel frequency-domain position; and when the scheduling manner corresponding to the carrier is self-scheduling, the physical downlink control channel frequency-domain position is determined according to the signaling, and the DCI for carrying the scheduling data corresponding to the carrier is transmitted according to the physical downlink control channel frequency-domain position, wherein the signaling is carried on the common channel of the carrier, wherein the common channel is repeatedly transmitted on a frequency domain, each first granularity corresponds to one such common channel, and the using condition of the resource is identified with the first granularity, or, the signaling is carried on the physical downlink control channel of the common search space of the licensed carrier, and the licensed carrier can be determined in a predefinition manner or signaling indication manner.

In the embodiment of the disclosure, whether a preconfigured resource position is available is determined according to the available resource of the carrier, the physical downlink control channel frequency-domain position is determined at a position of the available resource if the preconfigured resource position is available, while the physical downlink control channel frequency-domain position is determined at a predefined resource position if the preconfigured resource position is not available;

the physical downlink control channel frequency-domain position is determined in combination with the preconfigured resource position according to a predefined offset manner; and the physical downlink control channel frequency-domain position is determined at the predefined resource position according to the available resource of the carrier.

In the embodiment of the disclosure, a predefined resource includes a predefined resource in a predefined basic system bandwidth corresponding to the available resource, wherein the predefined basic system bandwidth corresponding to the available resource includes one of: a first available basic system bandwidth, a last available basic system bandwidth and an available system bandwidth with a lowest index value in system bandwidths closest to pre-configured resource position, wherein the predefined resource in the basic system bandwidth includes at least one of:

relative positions of preconfigured resources in the basic system bandwidth, n predefined continuous resource blocks, wherein n is a positive integer, and n predefined uniformly-spaced resource blocks, wherein n is a positive integer.

In the embodiment of the disclosure, the relative positions of the preconfigured resources in the basic system bandwidth may be determined in a following manner: indicating the relative positions in the basic system bandwidth through high-layer signaling, and selecting the basic system bandwidth according to a preset rule;

the n predefined continuous resource blocks include at least one of: for a basic system bandwidth, first n continuous resource blocks, last n continuous resource blocks and middle n continuous resource blocks, wherein a starting resource block position of the n continuous resource blocks is determined according to the cell ID:

for the n predefined continuous resource blocks, n is a positive integer, the n predefined continuous resource blocks include at least one of: the first n continuous resource blocks, last n continuous resource blocks and middle n continuous resource blocks of the basic system bandwidth, and the starting resource block position of the n continuous resource blocks is determined according to the cell ID; and the n predefined uniformly-spaced resource blocks is determined according at least one of: selecting n resource blocks according to a maximum spacing of the basic system bandwidth, determining a starting position as a first resource block, determining the position of the starting resource block according to the cell ID and configuring the spacing through high-layer signaling.

In the embodiment of the disclosure, the operation that the physical downlink control channel frequency-domain position is determined in combination with the preconfigured resource position in the predefined offset manner includes: the preconfigured resource position is upwards or downwards offset according to h basic system bandwidths to obtain the position of the available resource in the available basic system bandwidth and determine the physical downlink control channel frequency-domain position, wherein h is a positive integer; and the preconfigured resource position is within a basic system bandwidth.

In the embodiment of the disclosure, the physical downlink control channel frequency-domain position is discretely preconfigured on each basic system bandwidth, the physical downlink control channel frequency-domain position is used to transmit the DCI corresponding to carrier, the preconfigured physical downlink control channel frequency-domain position is determined according to the current available resource, and the DCI is transmitted through the available resource.

In the embodiment of the disclosure, a bit number of a format of the DCI for the scheduling data is determined according to the original system bandwidth, or the bit number of the format of the DCI is determined according to the current available system bandwidth.

Second Embodiment

Figure 2:
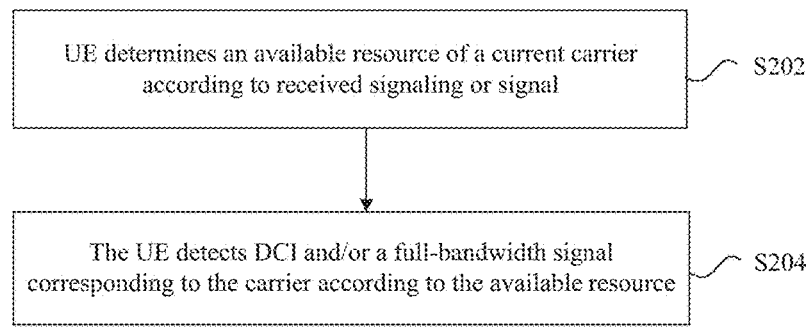
FIG. 2 is another flowchart of a resource use method according to an embodiment of the disclosure.

The second embodiment of the disclosure provides a resource use method. FIG. 2 is another flowchart of a resource use method according to an embodiment of the disclosure. As shown in FIG. 2, the flow includes the following steps.

In Step S202, UE determines an available resource of a current carrier according to received signaling or signal.

In Step S204, the UE detects DCI and/or a full-bandwidth signal corresponding to the carrier according to the available resource.

By above steps, the UE determines the available resource of the current carrier according to the received signaling or signal, and detects the DCI and/or full-bandwidth signal corresponding to the carrier according to the available resource, so that the problem of low spectrum resource utilization rate is solved, and a spectrum utilization rate is increased.

In the embodiment of the disclosure, the operation that the available resource of the current carrier is determined and the DCI and/or full-bandwidth signal corresponding to the carrier is detected according to the available resource includes:

an available basic system bandwidth of the carrier is determined according to the available resource, wherein the basic system bandwidth is divided according to a first granularity;

a frequency-domain position for transmitting the DCI for data scheduling corresponding to the carrier is determined according to the available basic system bandwidth;

the DCI is detected at the frequency-domain position, and data receiving or data transmission is performed according to the detected DCI.

In the embodiment of the disclosure, the signal includes at least one of: an occupation signal corresponding to the carrier, a synchronization signal corresponding to the carrier, a discovery signal corresponding to the carrier and a starting position identification signal corresponding to the carrier, wherein the signal is repeatedly transmitted on a frequency domain, each first granularity corresponds to one such signal, and a using condition of the resource is identified with the first granularity.

The signaling is carried on a common channel of the carrier, wherein the common channel is repeatedly transmitted on the frequency domain, and each first granularity corresponds to one such common channel, or, the signaling is carried on a physical downlink control channel of a common search space of a licensed carrier, and the licensed carrier can be determined in a predefinition manner or a signaling indication manner.

In the embodiment of the disclosure, under the condition that the signaling is carried on the physical downlink control channel of the common search space of the licensed carrier, multiple unlicensed carriers corresponding to the signaling are transmitted on a same physical downlink control channel, and the physical downlink control channel corresponds to a dedicated RNTI and a dedicated DCI Format;

the UE identifies the physical downlink control channel according to the RNTI, and a bit number corresponding to the signaling is determined according to an original system bandwidth, or, the bit number is fixedly q bits, q including one of: 4 and 2;

a bit number of a DCI Format 6 corresponding to the signaling is the same as a bit number corresponding to a DCI Format 1A and a DCI Format 1C, and is positioned in the common search space;

a starting position of the signaling in the DCI Format is configured through high-layer signaling; and the common channel is repeatedly transmitted on each basic system bandwidth, wherein the basic system bandwidth is obtained by dividing the carrier according to the first granularity, and the using condition of the resource is identified with the first granularity.

In the embodiment of the disclosure, the full-bandwidth signal is received or detected according to the available system bandwidth of the carrier;

the full-bandwidth signal is received or detected according to the original system bandwidth corresponding to the carrier;

an available resource indication signal or the common channel carrying available resource indication signaling is received or detected in a manner of repetition with the basic system bandwidth as a unit; and the full-bandwidth signal includes at least one of: a discovery signal, a synchronization signal, a measurement signal and an occupation signal.

The available resource indication signal includes at least one of: a discovery signal, a synchronization signal, a measurement signal and an occupation signal.

In the embodiment of the disclosure, when a scheduling manner corresponding to the carrier is self-scheduling, a physical downlink control channel frequency-domain position is determined according to the available resource of the carrier, and DCI for carrying scheduling data corresponding to the carrier is transmitted according to the physical downlink control channel frequency-domain position; and when the scheduling manner corresponding to the carrier is self-scheduling, the physical downlink control channel frequency-domain position is determined according to the signaling, and the DCI for carrying the scheduling data corresponding to the carrier is transmitted according to the physical downlink control channel frequency-domain position, wherein the signaling is carried on the common channel of the carrier, wherein the common channel is repeatedly transmitted on the frequency domain, each first granularity corresponds to one such common channel, and the using condition of the resource is identified with the first granularity, or, the signaling is carried on the physical downlink control channel of the common search space of the licensed carrier, and the licensed carrier can be determined in a predefinition manner or a signaling indication manner.

In the embodiment of the disclosure, whether a preconfigured resource position is available is determined according to the available resource of the carrier, the physical downlink control channel frequency-domain position is determined at the position of the available resource if the preconfigured resource position is available, while the physical downlink control channel frequency-domain position is determined at a predefined resource position if the preconfigured resource position is not available;

the physical downlink control channel frequency-domain position is determined in combination with the preconfigured resource position according to a predefined offset manner; and the physical downlink control channel frequency-domain position is determined at the predefined resource position according to the available resource of the carrier.

In the embodiment of the disclosure, a predefined resource includes a predefined resource in a predefined basic system bandwidth corresponding to the available resource, wherein the predefined basic system bandwidth corresponding to the available resource includes one of: a first available basic system bandwidth, a last available basic system bandwidth and an available system bandwidth with a lowest index value in system bandwidths closest to pre-configured resource position, wherein the predefined resource in the basic system bandwidth includes at least one of:

relative positions of a preconfigured resources in the basic system bandwidth, n predefined continuous resource blocks, wherein n is a positive integer, and n predefined uniformly-spaced resource blocks, wherein n is a positive integer.

In the embodiment of the disclosure, the relative positions of the preconfigured resources in the basic system may be determined in a following manner: indicating the relative positions in the basic system bandwidth through high-layer signaling, and selecting the basic system bandwidth selection according to a preset rule;

the n predefined continuous resource blocks include at least one of: for a basic system bandwidth, first n continuous resource blocks, last n continuous resource blocks and middle n continuous resource blocks, wherein a starting resource block positions of the n continuous resource block is determined according to the cell ID;

for the n predefined continuous resource blocks, n is a positive integer, the n predefined continuous resource blocks include at least one of: the first n continuous resource blocks, last n continuous resource blocks and middle n continuous resource blocks of the basic system bandwidth, and the starting resource block position of the n continuous resource blocks is determined according to the cell ID; and the n predefined uniformly-spaced resource blocks are determined through at least one of: selecting n resource blocks according to a maximum spacing of the basic system bandwidth, determining a starting position as a first resource block, determining the position of the starting resource block according to the cell ID and configuring the spacing through high-layer signaling.

In the embodiment of the disclosure, the operation that the physical downlink control channel frequency-domain position is determined in combination with the preconfigured resource position in the predefined offset manner includes: the preconfigured resource position is upwards or downwards offset according to h basic system bandwidths to obtain the position of the available resource in the available basic system bandwidth and determine the physical downlink control channel frequency-domain position, wherein h is a positive integer; and the preconfigured resource position is within a basic system bandwidth.

In the embodiment of the disclosure, the physical downlink control channel frequency-domain position is discretely preconfigured on each basic system bandwidth, the physical downlink control channel frequency-domain position is used to transmit the DCI corresponding to carrier, the preconfigured physical downlink control channel frequency-domain position is determined according to the current available resource, and the DCI is transmitted through the available resource.

In the embodiment of the disclosure, a bit number of a format of the DCI for the scheduling data is determined according to the original system bandwidth, or the bit number of the format of the DCI is determined according to the current available system bandwidth.

Third Embodiment

Figure 3:
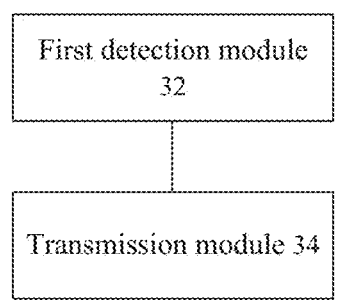
FIG. 3 is a structure block diagram of a resource use device according to an embodiment of the disclosure.

The third embodiment of the disclosure provides a resource use device. FIG. 3 is a structure block diagram of a resource use device according to an embodiment of the disclosure. As shown in FIG. 3, the device is positioned in a transmission node, and the device includes:

a first detection module 32, configured to dynamically change a size of a resource corresponding to a current carrier according to information detected on the current carrier; and a transmission module 34, configured to perform data transmission through the changed carrier.

By the device, the transmission node dynamically changes the size of the resource corresponding to the carrier according to the information detected on the current carrier, and performs data transmission through the changed carrier, so that the problem of low spectrum resource utilization rate is solved, and a spectrum utilization rate is increased.

In the embodiment of the disclosure, the device further includes:

a notification module, configured to notify position information of the resource corresponding to the carrier to UE through a signal or signaling.

The notification module includes at least one of:

a first sending unit, configured to send a full-bandwidth signal according to an available system bandwidth corresponding to an available resource of the carrier; and a second sending unit, configured to send the full-bandwidth signal according to an original system bandwidth corresponding to the carrier, wherein the full-bandwidth signal is sent in a manner of repetition with a basic system bandwidth as a unit, and the full-bandwidth signal includes at least one of: a discovery signal, a synchronization signal, a measurement signal and an occupation signal.

In the embodiment of the disclosure, the transmission module 34 includes:

a first transmission unit, configured to, when a scheduling manner corresponding to the carrier is self-scheduling, determine a frequency-domain position of a physical downlink control channel according to the available resource of the carrier, and transmit DCI for carrying scheduling data corresponding to the carrier according to the physical downlink control channel frequency-domain position; and a second transmission unit, configured to, when the scheduling manner corresponding to the carrier is self-scheduling, determine the physical downlink control channel frequency-domain position according to signaling, and transmit the DCI for carrying the scheduling data corresponding to the carrier according to the physical downlink control channel frequency-domain position, wherein the signaling is carried on a common channel of the carrier, wherein the common channel is repeatedly transmitted on a frequency domain, and each first granularity corresponds to one such common channel, or, the signaling is carried on the physical downlink control channel of a common search space of a licensed carrier, and the licensed carrier can be determined in a predefinition manner or a signaling indication manner.

Third Embodiment

Figure 4:
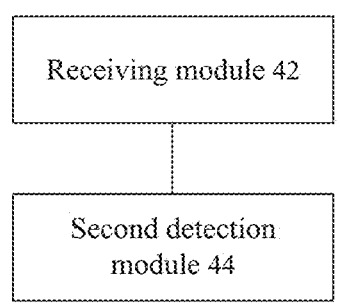
FIG. 4 is another structure block diagram of a resource use device according to an embodiment of the disclosure.

The third embodiment of the disclosure provides a resource use device. FIG. 4 is another structure block diagram of a resource use device according to an embodiment of the disclosure. As shown in FIG. 4, the device is positioned in UE, and the device includes:

a receiving module 42, configured to determine an available resource of a current carrier according to received signaling or signal; and a second detection module 44, configured to detect DCI and/or a full-bandwidth signal corresponding to the carrier according to the available resource.

By the device, the UE determines the available resource of the current carrier according to the received signaling or signal, and detects the DCI and/or full-bandwidth signal corresponding to the carrier according to the available resource, so that the problem of low spectrum resource utilization rate is solved, and a spectrum utilization rate is increased.

In the embodiment, the second detection module 44 includes:

a frequency-domain position determination unit, configured to determine a frequency-domain position for transmitting the DCI for data scheduling corresponding to the carrier according to an available basic system bandwidth; and a detection unit, configured to detect the DCI at the frequency-domain position, and perform data receiving or data transmission according to the detected DCI.

Fifth Embodiment

The fifth embodiment of the disclosure provides a resource using system. According to another embodiment of the disclosure, a resource using system is further provided, which includes: a transmission node and UE, wherein the transmission node dynamically changes a size of a resource corresponding to a carrier according to information detected on the current carrier, and performs data transmission through the changed carrier;

position information of the resource corresponding to the carrier is notified to the UE through a signal or signaling; and the UE receives the signaling or signal, determines an available resource of the current carrier, and detects DCI and/or a full-bandwidth signal corresponding to the carrier according to the available resource.

The disclosure will be described below in detail in combination with examples and implementation modes.

A preferred embodiment provides an unlicensed carrier communication system. For a communication system using unlicensed carriers, it is necessary to avoid use of an unlicensed carrier which is being used by an existing station in the unlicensed carriers, since the use may cause intersystem interference. Therefore, in some countries (for example, Europe and Japan), an unlicensed carrier is compulsively required to support a Listen Before Talk (LBT) function. Before a certain unlicensed carrier is used, it is necessary to execute a CCA function, and if it is found that there is equipment being using the unlicensed carrier or detected signal energy exceeds a CCA threshold, access is delayed. If it is found that a channel is idle or the detected signal energy is lower than the CCA threshold, the unlicensed carrier is occupied. In such a manner, if a current carrier corresponds to a resource of 20 MHz and an LAA system is intended to use the carrier, it is necessary to ensure that the carrier is not occupied by another LAA system or WiFi system, even though a bandwidth occupied by the other system is part of resource of the carrier, for example, 5 MHz.

In the preferred embodiment, a resource use method is provided, which specifically includes that:

a transmission node dynamically changes a size of a resource corresponding to a current carrier according to information detected on the current carrier, and performs data transmission through the changed carrier.

Furthermore, the detected information includes: a using condition of the resource corresponding to the carrier, wherein the using condition of the resource includes: identifying the using condition of the resource with a predefined granularity, wherein the predefined granularity has a same function and effect with the first granularity in the abovementioned embodiment, and the predefined granularity is preferably a 5 MHz system bandwidth (it may also be other granularities, for example: 20 MHz, 10 MHz, 1 MHz and 3 MHz), i.e., 25 Physical Resource Blocks (PRBs), and may further include a specific granularity such as 1 MHz, 4 MHz, 1.4 MHz, 2.6 MHz, 6 PRBs and 19 PRBs, and 4 PRBs and 21 PRBs.

Furthermore, granularity resources may correspond to one or more detection threshold values, wherein the granularity resources have a same function and effect with the second granularity in the abovementioned embodiment, different granularity resources may correspond to a same detection threshold value or different detection threshold values, and a difference is reflected in a manner that a threshold value of a granularity resource adjacent to the occupied resource is different from a threshold value of a granularity resource not adjacent to the occupied resource.

The detection threshold value includes one of: an average energy detection threshold value corresponding to the second-granularity resource and/or a minimum bandwidth energy detection threshold value corresponding to the second-granularity resource, for example: a minimum bandwidth corresponding to a 5 MHz granularity is 1 MHz.

An original resource corresponding to the carrier may also be 10 MHz and 15 MHz system bandwidths, and the number of corresponding basic bandwidths is 2 and 3.

Furthermore, a position of the resource corresponding to the carrier is notified to UE through a signal or signaling.

Preferably, the signal is an occupation signal of an LAA system or a synchronization signal of the LAA system or a discovery signal of the LAA system or a starting position identification signal, and the signaling is carried on a common channel of the carrier or a physical downlink control channel of a common search space of a licensed carrier, wherein the common channel (the signal) is repeatedly transmitted on a frequency domain, and each predefined granularity corresponds to a common channel/signal.

A sequence corresponding to the signal may be a pseudo-random QPSK symbol sequence, and may also be a ZC sequence, or a Walsh sequence or a pseudo-random BPSK sequence or the like. The sequence may be repeatedly transmitted on each basic bandwidth, or, a long sequence is generated according to a maximum bandwidth, and the sequence is correspondingly acquired from the long sequence according to a position of each basic bandwidth.

A frequency-domain position corresponding to the signal may be uniformly spaced or continuous.

The specific sequence and frequency-domain position selection may be obtained according to a cell ID, and may also be predefined.

Preferably, when the signaling is carried on the physical downlink control channel of the common search space of the licensed carrier, multiple unlicensed carriers corresponding to the signaling may be transmitted on a same physical downlink control channel, the physical downlink control channel corresponds to a dedicated RNTI and a dedicated DCI Format (for example: a DCI Format 6), the physical downlink control channel is identified through the RNTI, and a bit number corresponding to the signaling is determined according to the original system bandwidth, or, the bit number is fixedly q bits, q being preferably 4 and 2; a bit number of the DCI Format (the DCI Format 6) corresponding to the signaling is the same as a bit number corresponding to a DCI Format 1A or a DCI Format 1C, and is positioned in the common search space; and a starting position of the signaling in the DCI Format is configured through high-layer signaling.

By such a method, the UE may learn about the position of the available resource of the current resource, and further performs synchronization, measurement and DCI detection according to the position of the available resource.

Furthermore, a full-bandwidth signal is sent according to the current available system bandwidth, or, the full-bandwidth signal is sent according to the original system bandwidth corresponding to the carrier, and only a signal corresponding to an unavailable resource is rejected, or, the full-bandwidth signal is sent in a manner of repetition with the basic system bandwidth as a unit.

Preferably, the full-bandwidth signal specifically includes at least one of: a discovery signal, a synchronization signal, a measurement signal and an occupation signal.

Furthermore, when a scheduling manner corresponding to the carrier is self-scheduling, a physical downlink control channel frequency-domain position for transmitting the DCI for carrying scheduling data corresponding to the carrier is determined according to the available resource of the carrier, or, the physical downlink control channel frequency-domain position for transmitting the DCI corresponding to the carrier is determined according to the signaling, wherein the signaling is carried on the common channel of the carrier, the common channel is repeatedly transmitted on the frequency domain, and each predefined granularity corresponds to a common channel.

Furthermore, the operation that the physical downlink control channel frequency-domain position for transmitting the DCI for carrying the scheduling data corresponding to the carrier is determined according to the available resource of the carrier specifically can be performed in a first manner or a second manner.

A first manner: whether a preconfigured resource position is available is determined at first according to the available resource of the carrier, the transmission of the DCI is performed at the available resource position if the preconfigured resource position is available, while the transmission of the DCI is performed at a predefined resource position if preconfigured resource position is not available; or, the physical downlink control channel frequency-domain position is determined in combination with the preconfigured resource position according to a predefined offset manner; or, the transmission of the DCI is performed at the predefined resource position according to the available resource of the carrier.

Preferably, a predefined resource includes a predefined resource in a predefined available basic system bandwidth, wherein the predefined available basic system bandwidth includes: a first available basic system bandwidth, or, a last available basic system bandwidth, or, an available system bandwidth with a lower index value in system bandwidths pre-configured resource position. The predefined resource in the basic system bandwidth specifically includes: relative positions of preconfigured resources in the basic system bandwidth, for example: the relative positions in the basic system bandwidth are identified through high-layer signaling and a basic system bandwidth is selected according to a preset rule; or, n predefined continuous resource blocks, for example: for a basic system bandwidth, first n continuous resource blocks or last n continuous resource blocks or middle n continuous resource blocks, or, a starting resource block position of the n continuous resource blocks determined according to the cell ID; or, n predefined uniformly-spaced resource blocks, for example, which are selected according to a maximum spacing of the basic system bandwidth, a starting position of which is a first resource block, or, the position of the starting resource block is determined according to the cell ID, or, the spacing is configured through high-layer signaling.

Preferably, the operation that the preconfigured resource position is combined for determination according to the predefined offset manner specifically includes: the preconfigured resource position is upwards or downwards offset according to h basic system bandwidths, thereby obtaining the position of the available resource in the available basic system bandwidth; and preferably, the preconfigured resource position is within only one basic system bandwidth.

A second manner: the physical downlink control channel frequency-domain position for transmitting the DCI corresponding to the carrier is discretely preconfigured on each basic system bandwidth (that is, there is a physical downlink control channel resource for transmitting the DCI corresponding to the carrier on each basic system bandwidth), the specific available resource in the preconfigured resource is determined according to the current available resource, and the DCI is transmitted through the available resource.

Furthermore, a bit number of a DCI Format corresponding to the DCI for the scheduling data is determined according to the original system bandwidth, or, the bit number of the DCI Format corresponding to the DCI is determined according to the current available system bandwidth.

The original system bandwidth is a maximum system bandwidth corresponding to the carrier.

In the preferred embodiment, a resource use method is further disclosed, which specifically includes that:

UE determines an available resource of a current carrier according to received signaling or signal, and detects DCI and/or a full-bandwidth signal corresponding to the carrier according to the available resource.

Furthermore, the signal is an occupation signal of an LAA system or a synchronization signal of the LAA system or a discovery signal of the LAA system or a starting position identification signal.

Furthermore, the signaling is carried on a common channel of the carrier or the signaling is carried on a physical downlink control channel of a common search space of a licensed carrier, wherein the common channel (the signal) is repeatedly transmitted on a frequency domain, and each predefined granularity corresponds to a common channel/signal.

Furthermore, when the signaling is carried on the physical downlink control channel of the common search space of the licensed carrier, multiple unlicensed carriers may be transmitted on the same physical downlink control channel corresponding to the signaling, the physical downlink control channel corresponds to a dedicated RNTI and a dedicated DCI Format (for example: a DCI Format 6), the physical downlink control channel is identified through the RNTI, and a bit number corresponding to the signaling is determined according to the original system bandwidth, or, the bit number is fixedly q bits, q being preferably 4 and 2; a bit number of the DCI Format (the DCI Format 6)

corresponding to the signaling is the same as a bit number corresponding to a DCI Format 1A or a DCI Format 1C, and is positioned in the common search space; and a starting position of the signaling in the DCI Format is configured through high-layer signaling.

Furthermore, the full-bandwidth signal is detected according to the current available system bandwidth, or, the full-bandwidth signal is detected according to the original system bandwidth corresponding to the carrier, or, the full-bandwidth signal is detected in a manner of repetition with a basic system bandwidth as a unit.

Preferably, the full-bandwidth signal specifically includes: a discovery signal, a synchronization signal, a measurement signal and an occupation signal.

Furthermore, when a scheduling manner corresponding to the carrier is self-scheduling, a physical downlink control channel frequency-domain position for transmitting the DCI for carrying scheduling data corresponding to the carrier is determined according to the available resource of the carrier, or, the physical downlink control channel frequency-domain position for transmitting the DCI corresponding to the carrier is determined according to the signaling, wherein the signaling is carried on the common channel of the carrier, the common channel is repeatedly transmitted on the frequency domain, and each predefined granularity corresponds to a common channel.

Furthermore, the determination operation according to the available resource of the carrier specifically can be performed in a first manner or a second manner.

A first manner: whether a preconfigured resource position is available is determined at first according to the available resource of the carrier, the transmission of the DCI is performed at the available resource position if the preconfigured resource position is available, while the transmission of the DCI is performed at a predefined resource position if preconfigured resource position is not available; or, the physical downlink control channel frequency-domain position is determined in combination with the preconfigured resource position according to a predefined offset manner; or, the transmission of the DCI is performed at the predefined resource position according to the available resource of the carrier.

Preferably, a predefined resource includes a predefined resource in a predefined available basic system bandwidth, wherein the predefined available basic system bandwidth includes: a first available basic system bandwidth, or, a last available basic system bandwidth, or, an available system bandwidth with a lower index value in system bandwidths pre-configured resource position. The predefined resource in the basic system bandwidth specifically includes: relative positions of preconfigured resources in the basic system bandwidth, for example: the relative positions in the basic system bandwidth are indicated through high-layer signaling and a basic system bandwidth is selected according to a preset rule; or, n predefined continuous resource blocks, for example: for a basic system bandwidth, first n continuous resource blocks or last n continuous resource blocks or middle n continuous resource blocks, or, a starting resource block position of the n continuous resource blocks determined according to the cell ID; or, n predefined uniformly-spaced resource blocks, for example, which is selected according to a maximum spacing of the basic system bandwidth, a starting position of which is a first resource block, or, the position of the starting resource block is determined according to the cell ID, or, the spacing is configured through high-layer signaling.

Preferably, the operation that the preconfigured resource position is combined for determination according to the predefined offset manner specifically includes: the preconfigured resource position is upwards or downwards offset according to h basic system bandwidths, thereby obtaining the position of the available resource in the available basic system bandwidth; and preferably, the preconfigured resource position is within only one basic system bandwidth.

A second manner: the physical downlink control channel frequency-domain position for transmitting the DCI corresponding to the carrier is discretely preconfigured on each basic system bandwidth (that is, there is a physical downlink control channel resource for transmitting the DCI corresponding to the carrier on each basic system bandwidth), the specific available resource in the preconfigured resource is determined according to the current available resource, and the DCI is transmitted through the available resource.

Furthermore, a bit number of a DCI Format corresponding to the DCI for the scheduling data is determined according to the original system bandwidth, or, the bit number of the DCI Format corresponding to the DCI is determined according to the current available system bandwidth.

In such a manner, resource waste is reduced, and resource using efficiency and a system throughput are improved.

Example 1

Assume that, for a current carrier of 20 MHz, which is divided into 4 basic bandwidths with 5 MHz as a predefined granularity, a base station or UE detects 4 basic bandwidth resources respectively, determines a using condition of the resources, and determines the resource which is not occupied as a current available system bandwidth for data transmission, wherein each basic bandwidth corresponds to the same detection threshold value, and the available system bandwidth may be continuous, or may also be discontinuous.

If the LAA base station finds by detection on the carrier corresponding to a current sub-frame that a first basic bandwidth, a second basic bandwidth and a fourth basic bandwidth of the four basic bandwidths are available, and then repeatedly sends a signal (a first signal) on the available basic bandwidths, wherein the signal may be an occupation signal, a synchronization signal, a discovery signal and a starting position identification signal; a sequence corresponding to the signal may be a pseudo-random QPSK symbol sequence, may also be a ZC sequence, or, a Walsh sequence, or, a pseudo-random BPSK sequence or the like; and the sequence may be repeatedly transmitted on each basic bandwidth, or, a long sequence is generated according to a maximum bandwidth, and the sequence is correspondingly acquired from the long sequence according to a position of each basic bandwidth.

A frequency-domain position corresponding to the signal may be uniformly-spaced or continuous.

The specific sequence and frequency-domain position selection may be obtained according to a cell ID, and may also be predefined.

A full-bandwidth signal is sent according to the current available system bandwidths, or, the full-bandwidth signal is sent according to the original system bandwidth corresponding to the carrier, and only a signal corresponding to an unavailable resource is rejected, or, the full-bandwidth signal is sent in a manner of repetition with the basic system bandwidth as a unit; and the full-bandwidth signal specifically includes: a discovery signal, a synchronization signal, a measurement signal and an occupation signal.

When a scheduling manner corresponding to the carrier is self-scheduling, a physical downlink control channel frequency-domain position for transmitting DCI corresponding to the carrier is determined according to the available resources of the carrier.

This determination step includes that: whether a preconfigured resource position is available is determined at first according to the available resources of the carrier, the transmission of the DCI is performed is performed at the available resource position if the preconfigured resource position is available, while the transmission of the DCI is performed at a predefined resource position if the preconfigured resource position is not available; or, the physical downlink control channel frequency-domain position is determined in combination with the preconfigured resource position is combined for determination according to a predefined offset manner.

Preferably, a predefined resource includes a predefined resource in a predefined available basic system bandwidth, wherein the predefined available basic system bandwidth includes: a first available basic system bandwidth, or, a last available basic system bandwidth, or, an available system bandwidth with a lower index value in system bandwidths pre-configured resource position (the fourth basic bandwidth in the embodiment). The predefined resource in the basic system bandwidth specifically includes: relative positions of preconfigured resources in the basic system bandwidth, for example: the relative positions in the basic system bandwidth are identified through high-layer signaling and a basic system bandwidth is selected according to a preset rule; or, n predefined continuous resource blocks, for example: for a basic system bandwidth, first n continuous resource blocks or last n continuous resource blocks or middle n continuous resource blocks, or, a starting resource block position of the n continuous resource blocks determined according to the cell ID; or, n predefined uniformly-spaced resource blocks, for example, which is selected according to a maximum spacing of the basic system bandwidth, a starting position of which is a first resource block, or, the position of the starting resource block is determined according to the cell ID, or, the spacing is configured through high-layer signaling.

A bit number of a DCI Format corresponding to the DCI for scheduling data is determined according to the original system bandwidth, or, the bit number of the DCI Format corresponding to the DCI is determined according to the current available system bandwidth.

The UE detects the signal (the first signal) on the four basic system bandwidths of the carrier, obtains available resource information, determines the available basic system bandwidths, then determines the frequency-domain position for transmitting the DCI for data scheduling corresponding to the carrier according to the available basic system bandwidths, detects the DCI at the frequency-domain position, and performs data receiving or data transmission according to the detected DCI (including downlink data scheduling information and/or uplink data scheduling information).

Wherein, a method for determining the frequency-domain position specifically includes that:

whether the preconfigured resource position is available is determined at first according to the available resources of the carrier, the data transmission is performed at the available resource position if the preconfigured resource position is available, while the data transmission is performed at a predefined resource position if the preconfigured resource position is not available; or, the preconfigured resource position is combined for determination according to the predefined offset manner.

Preferably, the predefined resource includes a predefined resource in a predefined available basic system bandwidth, wherein the predefined available basic system bandwidth includes: a first available basic system bandwidth, or, a last available basic system bandwidth, or, an available system bandwidth with a lower index value in system bandwidths pre-configured resource position (the fourth basic bandwidth in the embodiment). The predefined resource in the basic system bandwidth specifically includes: relative positions of preconfigured resources in the basic system bandwidth, for example: the relative positions in the basic system bandwidth are identified through high-layer signaling and a basic system bandwidth is selected according to a preset rule; or, n predefined continuous resource blocks, for example: for a basic system bandwidth, first n continuous resource blocks or last n continuous resource blocks or middle n continuous resource blocks, or, a starting resource block position of the n continuous resource blocks determined according to the cell ID; or, n predefined uniformly-spaced resource blocks, for example, which is selected according to a maximum spacing of the basic system bandwidth, a starting position of which is a first resource block, or, the position of the starting resource block is determined according to the cell ID, or, the spacing is configured through high-layer signaling.

The UE receives or detects the synchronization signal or the measurement signal or the discovery signal according to the available system bandwidths, and performs downlink synchronization or obtains downlink channel state information and the like.

The UE determines the bit number of the DCI Format corresponding to the DCI for the scheduling data in the following manner:

the bit number of the DCI Format corresponding to the DCI for the scheduling data is determined according to the original system bandwidth, or, the bit number of the DCI Format corresponding to the DCI is determined according to the current available system bandwidth.

Example 2

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 2 detection threshold values and only a detection value corresponding to the second basic bandwidth resource in detection values corresponding to the four basic bandwidth resources exceeds the relatively higher threshold value, it is indicated that the second basic bandwidth resource is occupied. Moreover, a threshold value corresponding to each of the first basic bandwidth resource and the third basic bandwidth resource is a relatively lower threshold value, and whether the first basic bandwidth resource and the third basic bandwidth resource are occupied is determined according to the threshold value. The threshold value corresponding to the fourth basic bandwidth resource is a relatively higher threshold value, and whether the fourth basic bandwidth resource is occupied is determined according to the threshold value. The resource which is not occupied is determined as a current available system bandwidth for data transmission, and the available system bandwidth may be continuous, or may also be discontinuous.

If the LAA base station finds by detection on the carrier corresponding to a current sub-frame that the first basic bandwidth, third basic bandwidth and fourth basic bandwidth of the four basic bandwidths are available, then the LAA base station sends signaling to notify available resource information to the UE, where the signaling is carried on a physical downlink control channel of a common search space of a licensed carrier.

When the signaling is carried on the physical downlink control channel of the common search space of the licensed carrier, multiple unlicensed carriers may be transmitted on the same physical downlink control channel corresponding to the signaling, the physical downlink control channel corresponds to a dedicated RNTI (a Cyclic Redundancy Check (CRC) corresponding to DCI is scrambled through the RNTI) and a dedicated DCI Format (for example: a DCI Format 8), the physical downlink control channel is identified through the RNTI, and a bit number corresponding to the signaling is determined according to the original system bandwidth, for example: for a basic system bandwidth being 1 bit, if a maximum system bandwidth corresponding to the carrier is 20 MHz, the signaling is 4 bits; if the maximum system bandwidth corresponding to the carrier is 15 MHz, the signaling is 3 bits; and if the maximum system bandwidth corresponding to the carrier is 10 MHz, the signaling is 2 bits, or, the signaling is fixedly q bits, q preferably being 4.

A bit number of the DCI Format (the DCI Format 8) corresponding to the signaling is the same as a bit number corresponding to a DCI Format 1A or a DCI Format 1C, an is positioned in the common search space; and a starting position of the signaling corresponding to the carrier in the DCI Format is configured through high-layer signaling.

A full-bandwidth signal is sent according to the current available system bandwidths, or, the full-bandwidth signal is sent according to the original system bandwidth corresponding to the carrier, and only a signal corresponding to an unavailable resource is rejected, or, the full-bandwidth signal is sent in a manner of repetition with the basic system bandwidth as a unit; and the full-bandwidth signal specifically includes: a discovery signal, a synchronization signal, a measurement signal and an occupation signal.

When a scheduling manner corresponding to the carrier is self-scheduling, a physical downlink control channel frequency-domain position for transmitting DCI corresponding to the carrier is determined according to the available resources of the carrier.

The above determination step includes:

the physical downlink control channel frequency-domain position for transmitting the DCI for scheduling data corresponding to the carrier is discretely preconfigured on each basic system bandwidth (that is, there is a physical downlink control channel resource for transmitting the DCI corresponding to the carrier on each basic system bandwidth, for example: each basic system bandwidth corresponds to 2 resource blocks), the specific available resources in the preconfigured resources are determined according to the current available resources, and the DCI is transmitted through the available resources (6 resource blocks).

The bit number of the DCI Format corresponding to the DCI for the scheduling data is determined according to the original system bandwidth, or, the bit number of the DCI Format corresponding to the DCI is determined according to the current available system bandwidth.

The UE detects the signaling carrying available resources of the unlicensed carriers on the licensed carrier according to the dedicated RNTI configured by a high layer, after detecting the physical downlink control channel corresponding to the RNTI, acquires the signaling of the available resources of the unlicensed carriers according to the starting position configured by the high layer, obtains the available resource information (the first basic bandwidth, the third basic bandwidth and the fourth basic bandwidth are available), determines the available basic system bandwidths, then determines the frequency-domain position for transmitting the DCI for data scheduling corresponding to the carrier according to the available basic system bandwidths, detects the DCI at the frequency-domain position, and performs data receiving or data transmission according to the detected DCI (including downlink data scheduling information and/or uplink data scheduling information).

Wherein, a method for determining the frequency-domain position of the DCI specifically includes that:

the physical downlink control channel frequency-domain position for transmitting the DCI for the scheduling data corresponding to the carrier is discretely preconfigured on each basic system bandwidth (that is, there is a physical downlink control channel resource for transmitting the DCI corresponding to the carrier on each basic system bandwidth, for example: each basic system bandwidth corresponds to 2 resource blocks), the specific available resources (three basic system bandwidths are available, and each basic system bandwidth corresponds to 2 resource blocks) in the preconfigured resources are determined according to the current available resources, and the DCI is transmitted through the available resource (6 resource blocks).

The UE receives or detects the synchronization signal or the measurement signal or the discovery signal according to the available system bandwidths, and performs downlink synchronization or obtains downlink channel state information and the like.

The UE determines the bit number of the DCI Format corresponding to the DCI for the scheduling data in the following manner:

the bit number of the DCI Format corresponding to the DCI for the scheduling data is determined according to the original system bandwidth, or, the bit number of the DCI Format corresponding to the DCI is determined according to the current available system bandwidth.

Example 3

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 3 detection threshold values and only a detection value corresponding to the second basic bandwidth resource in detection values corresponding to the four basic bandwidth resources exceeds the maximum threshold value, it is indicated that the second basic bandwidth resource is occupied. Moreover, a threshold value corresponding to each of the first basic bandwidth resource and the third basic bandwidth resource is the minimum threshold value, and whether the first basic bandwidth resource and the third basic bandwidth resource are occupied is determined according to the threshold value. The threshold value corresponding to the fourth basic bandwidth resource is the second highest threshold value, and whether the fourth basic bandwidth resource is occupied is determined according to the threshold value. The resource which is not occupied is determined as a current available system bandwidth for data transmission, and the available system bandwidth may be continuous, or may also be discontinuous.

if the LAA base station finds by detection on the carrier corresponding to a current sub-frame that the first basic bandwidth and fourth basic bandwidth of the four basic bandwidths are available, then the LAA base station notifies positions of the resources corresponding to the carrier to the UE through signaling, where the signaling is carried on a common channel of the carrier, wherein the common channel is repeatedly transmitted on a frequency domain, and each predefined granularity (basic system bandwidth) corresponds to a common channel.

A full-bandwidth signal is sent according to the current available system bandwidths, or, the full-bandwidth signal is sent according to the original system bandwidth corresponding to the carrier, and only a signal corresponding to an unavailable resource is rejected, or, the full-bandwidth signal is sent in a manner of repetition with the basic system bandwidth as a unit; and the full-bandwidth signal specifically includes: a discovery signal, a synchronization signal, a measurement signal and an occupation signal.

When a scheduling manner corresponding to the carrier is self-scheduling, a physical downlink control channel frequency-domain position for transmitting DCI corresponding to the carrier is determined according to the available resources of the carrier.

The above determination step includes that:

when the scheduling manner corresponding to the carrier is self-scheduling, the physical downlink control channel frequency-domain position for transmitting the DCI corresponding to the carrier is determined according to signaling, wherein the signaling is carried on the common channel of the carrier (unlicensed carrier), the common channel is repeatedly transmitted on the frequency domain, and each predefined granularity (basic system bandwidth) corresponds to a common channel.

The physical downlink control channel frequency-domain position indication signaling and the signaling indicating whether the basic system bandwidths corresponding to the carrier are available may be transmitted through the same common channel, or, are transmitted through different common channels.

A bit number of a DCI Format corresponding to the DCI for scheduling data is determined according to the original system bandwidth, or, the bit number of the DCI Format corresponding to the DCI is determined according to the current available system bandwidth.

The UE detects the common channel on each basic system bandwidth of the unlicensed carrier, obtains available resource information (the first basic bandwidth and the fourth basic bandwidth are available) according to the signaling carried on the detected common channel, determines the available basic system bandwidths, then determines the frequency-domain position for transmitting the DCI for data scheduling corresponding to the carrier according to the signaling carried on the detected common channel, detects the DCI at the frequency-domain position, and performs data receiving or data transmission according to the detected DCI (including downlink data scheduling information and/or uplink data scheduling information).

The UE receives or detects the synchronization signal or the measurement signal or the discovery signal according to the available system bandwidths, and performs downlink synchronization or obtains downlink channel state information and the like.

The UE determines the bit number of the DCI Format corresponding to the DCI for the scheduling data in the following manner:

the bit number of the DCI Format corresponding to the DCI for the scheduling data is determined according to the original system bandwidth, or, the bit number of the DCI Format corresponding to the DCI is determined according to the current available system bandwidth.

Example 4

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 2 detection threshold values and only all minimum bandwidth detection values corresponding to the second basic bandwidth resource in detection values corresponding to the four basic bandwidth resources exceed the first threshold value, it is indicated that the second basic bandwidth resource is occupied. Moreover, a minimum bandwidth threshold value corresponding to each of the first basic bandwidth resource and the third basic bandwidth resource is the second threshold value, and whether the first basic bandwidth resource and the third basic bandwidth resource are occupied is determined according to the threshold value. The minimum bandwidth threshold value corresponding to the fourth basic bandwidth resource is the first threshold value, and whether the fourth basic bandwidth resource is occupied is determined according to the threshold value. The resource which is not occupied is determined as a current available system bandwidth for data transmission, and the available system bandwidth may be continuous, or may also be discontinuous.

If the LAA base station finds by detection on the carrier corresponding to a current sub-frame that the first basic bandwidth of the four basic bandwidths is available, the LAA base station repeatedly sends a signal (a first signal) on the available basic bandwidth, wherein the signal may be an occupation signal, a synchronization signal, a discovery signal and a starting position identification signal; a sequence corresponding to the signal may be a pseudo-random QPSK symbol sequence, may also be a ZC sequence, or, a Walsh sequence, or, a pseudo-random BPSK sequence or the like; and the sequence may be repeatedly transmitted on each basic bandwidth, or, a long sequence is generated according to a maximum bandwidth, and the sequence is correspondingly acquired from the long sequence according to a position of each basic bandwidth.

A frequency-domain position corresponding to the signal may be uniformly-spaced or continuous.

The specific sequence and frequency-domain position selection may be obtained according to a cell ID, or may also be predefined.

A full-bandwidth signal is sent according to the current available system bandwidths, or, the full-bandwidth signal is sent according to the original system bandwidth corresponding to the carrier, and only a signal corresponding to an unavailable resource is rejected, or, the full-bandwidth signal is sent in a manner of repetition with the basic system bandwidth as a unit; and the full-bandwidth signal specifically includes: a discovery signal, a synchronization signal, a measurement signal and an occupation signal.

When a scheduling manner corresponding to the carrier is self-scheduling, a physical downlink control channel frequency-domain position for transmitting DCI corresponding to the carrier is determined according to the available resource of the carrier.

The above determination step includes that: whether a preconfigured resource position is available is determined at first according to the available resource of the carrier, the transmission of the DCI is performed at the available resource position if the preconfigured resource position is available, while the preconfigured resource position is combined for determination according to a predefined offset manner if the preconfigured resource position is not available.

The base station pre-sends signaling to the UE to indicate a frequency-domain bandwidth corresponding to a physical downlink control channel corresponding to the unlicensed carrier, the frequency-domain bandwidth being positioned in a basic system bandwidth.

Whether the preconfigured resource position is available is determined at first according to the available resource of the carrier, the transmission of the DCI is performed at the available resource position if the preconfigured resource position is available, and while the preconfigured resource position is combined for determination according to the predefined offset manner if the preconfigured resource position is not available.

The operation that the preconfigured resource position is combined for determination according to the predefined offset manner specifically includes that: the preconfigured resource position is upwards or downwards offset according to h basic system bandwidths, thereby obtaining the position of the available resource in the available basic system bandwidth, a value of h being determined according to the latest available system bandwidth.

For example: the base station preconfigures n continuous resource blocks started from a t-th resource block in the second basic system bandwidth, and since only the first basic system bandwidth is available at present, the frequency-domain position is the n continuous resource blocks started from the t-th resource block in the first basic system bandwidth.

A bit number of a DCI Format corresponding to the DCI for scheduling data is determined according to the original system bandwidth, or, the bit number of the DCI Format corresponding to the DCI is determined according to the current available system bandwidth.

The UE detects the signal (the first signal) on the four basic system bandwidths of the carrier, obtains available resource information, determines the available basic system bandwidth, then determines the frequency-domain position for transmitting the DCI for data scheduling corresponding to the carrier according to the available basic system bandwidth, detects the DCI at the frequency-domain position, and performs data receiving or data transmission according to the detected DCI (including downlink data scheduling information and/or uplink data scheduling information).

Wherein, a method for determining the frequency-domain position specifically includes that:

the UE receives a signaling pre-sent by the base station, the signaling indicating the frequency-domain bandwidth corresponding to the physical downlink control channel corresponding to the unlicensed carrier and the frequency-domain bandwidth being positioned in a basic system bandwidth; and whether the preconfigured resource position is available is determined at first according to the available resource of the carrier, the data transmission is performed at the available resource position if the preconfigured resource position is available, while the preconfigured resource position is combined for determination according to the predefined offset manner if the preconfigured resource position is not available.

The operation that the preconfigured resource position is combined for determination according to the predefined offset manner specifically includes that: the preconfigured resource position is upwards or downwards offset according to h basic system bandwidths, thereby obtaining the position of the available resource in the available basic system bandwidth, the value of h being determined according to the latest available system bandwidth.

For example: the base station preconfigures the n continuous resource blocks started from the t-th resource block in the second basic system bandwidth, and since only the first basic system bandwidth is available at present, the frequency-domain position is the n continuous resource blocks started from the t-th resource block in the first basic system bandwidth, that is, h is 1, and upward movement by a basic system bandwidth is performed.

The UE receives or detects the synchronization signal or the measurement signal or the discovery signal according to the available system bandwidth, and performs downlink synchronization or obtains downlink channel state information and the like.

The UE determines the bit number of the DCI Format corresponding to the DCI for the scheduling data in the following manner:

the bit number of the DCI Format corresponding to the DCI for the scheduling data is determined according to the original system bandwidth, or, the bit number of the DCI Format corresponding to the DCI is determined according to the current available system bandwidth.

Example 5

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 2 detection threshold values and only all minimum bandwidth detection values corresponding to the second basic bandwidth resource in detection values corresponding to the four basic bandwidth resources exceed the first threshold value, it is indicated that the second basic bandwidth resource is occupied. Moreover, the minimum bandwidth threshold value corresponding to the first basic bandwidth resource, the third basic bandwidth resource and the fourth basic bandwidth resource is the second threshold value, and whether the first basic bandwidth resource and the third basic bandwidth resource are occupied is determined according to the threshold value. The resource which is not occupied is determined as a current available system bandwidth for data transmission, and the available system bandwidth may be continuous, or may also be discontinuous.

Example 6

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 2 detection threshold values and only all minimum bandwidth detection values corresponding to the second basic bandwidth resource in detection values corresponding to the four basic bandwidth resources exceed the first threshold value, it is indicated that the second basic bandwidth resource is occupied. Moreover, the first basic bandwidth resource and the third basic bandwidth resource are divided with two specific granularities, 6 PRBs adjacent to the second basic bandwidth resource are defined into the first specific granularity, and the other resources are divided with the second granularity. A threshold value corresponding to the first specific granularity is the second threshold value, a threshold value corresponding to the second specific granularity is the first threshold value, and when both a detection value corresponding to the first specific granularity corresponding to a basic bandwidth resource and a detection value corresponding to the second specific granularity corresponding to the basic bandwidth resource exceed the corresponding threshold values, it is indicated that the basic bandwidth resource is occupied, otherwise it is indicated that the basic bandwidth resource is not occupied.

The resource which is not occupied is determined as a current available system bandwidth for data transmission, and the available system bandwidth may be continuous, or may also be discontinuous.

Example 7

Assume that, for a current carrier of 20 MHz, which is divided into 4 basic bandwidths with 5 MHz as a predefined granularity, a base station or UE detects 4 basic bandwidth resources respectively, and determines a using condition of the resources. If the granularity resources correspond to 3 detection threshold values and only all minimum bandwidth detection values corresponding to the second basic bandwidth resource in detection values corresponding to the four basic bandwidth resources exceed the first threshold value, it is indicated that the second basic bandwidth resource is occupied. Moreover, the first basic bandwidth resource and the third basic bandwidth resource are divided with two specific granularities, 4 PRBs adjacent to the second basic bandwidth resource are defined into the first specific granularity, and the other resources are divided with the second granularity. A threshold value corresponding to the first specific granularity is the second threshold value, a threshold value corresponding to the second specific granularity is the third threshold value, and when both a detection value corresponding to the first specific granularity corresponding to a basic bandwidth resource and a detection value corresponding to the second specific granularity corresponding to the basic bandwidth resource exceed the corresponding threshold values, it is indicated that the basic bandwidth resource is occupied, otherwise it is indicated that the basic bandwidth resource is not occupied.

The resource which is not occupied is determined as a current available system bandwidth for data transmission, and the available system bandwidth may be continuous, and or also be discontinuous.

Example 8

Assume that, for a current carrier of 10 MHz, which is divided into 2 basic bandwidths with 5 MHz as a predefined granularity, a base station or UE detects 2 basic bandwidth resources respectively, and determines a using condition of the resources. If the granularity resources correspond to 2 detection threshold values and only all minimum bandwidth detection values corresponding to the second basic bandwidth resource in detection values corresponding to the two basic bandwidth resources exceed the first threshold value, it is indicated that the second basic bandwidth resource is occupied. Moreover, the first basic bandwidth resource is divided with two specific granularities, 6 PRBs adjacent to the second basic bandwidth resource are defined into the first specific granularity, and the other resources are divided with the second granularity. A threshold value corresponding to the first specific granularity is the first threshold value, a threshold value corresponding to the second specific granularity is the second threshold value, and when a detection value corresponding to the first specific granularity corresponding to a basic bandwidth resource or a detection value corresponding to the second specific granularity corresponding to the basic bandwidth resource exceeds the corresponding threshold value, it is indicated that the basic bandwidth resource is occupied, otherwise it is indicated that the basic bandwidth resource is not occupied.

The resource which is not occupied is determined as a current available system bandwidth for data transmission, and the available system bandwidth may be continuous, or may also be discontinuous.

Example 9

Assume that, for a current carrier of 15 MHz, which is divided into 3 basic bandwidths with 5 MHz as a predefined granularity, a base station or UE detects 3 basic bandwidth resources respectively, and determines a using condition of the resources. If the granularity resources correspond to 3 detection threshold values and only all minimum bandwidth detection values corresponding to the second basic bandwidth resource in detection values corresponding to two basic bandwidth resources exceed the first threshold value, it is indicated that the second basic bandwidth resource is occupied. Moreover, the first basic bandwidth resource is divided into two specific granularities, 2 PRBs adjacent to the second basic bandwidth resource are defined with the first specific granularity, and the other resources are divided with the second granularity. A threshold value corresponding to the first specific granularity is the second threshold value, a threshold value corresponding to the second specific granularity is the third threshold value, and when a detection value corresponding to the first specific granularity corresponding to a basic bandwidth resource and a detection value corresponding to the second specific granularity corresponding to the basic bandwidth resource exceeds the corresponding threshold value, it is indicated that the basic bandwidth resource is occupied, otherwise it is indicated that the basic bandwidth resource is not occupied.

The resource which is not occupied is determined as a current available system bandwidth for data transmission, and the available system bandwidth may be continuous, and may also be discontinuous.

Example 10

When a carrier is a licensed carrier, an application scenario is, but not limited to, the following scenario.

A transmission node dynamically changes a size of a resource corresponding to a current carrier according to information detected on the current carrier, and the transmission node performs data transmission through the changed carrier. For example: in a spectrum sharing scenario, when different systems share a spectrum, a resource corresponding to a carrier can be dynamically changed, which may improve multiplexing efficiency of the spectrum, and may also reduce interference influence due to out-of-band emission; and the detection on the carrier includes intersystem measurement and/or interference measurement.

The application scenario further includes: a heterogeneous network scenario, and the size of the resource corresponding to the carrier is dynamically changed to solve the problem of interference between adjacent nodes. For example: for a 20 MHz system bandwidth, a 10 MHz resource is adopted for transmission of a macro-cell, and two 5 MHz resources are adopted for micro-cells; and detection on the carrier includes adjacent cell measurement and/or interference measurement.

The application scenario further includes: a dynamic uplink and downlink data transmission regulation scenario, and the size of the resource corresponding to the carrier is dynamically changed to solve the problem of interference between an uplink and a downlink. For example: for a 20 MHz system bandwidth, 10 MHz is adopted for downlink data transmission as a downlink resource, 5 MHz is adopted for uplink data transmission or user-to-user data transmission as an uplink resource, and the other 5 MHz is adopted as a guard interval; and detection on the carrier includes interference type measurement and/or interference strength measurement.

From the above descriptions about the implementation modes, those skilled in the art may clearly know that the method of the embodiment may be implemented in a manner of combining software and a necessary universal hardware platform, and of course, may also be implemented through hardware, and the former is a better implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions configured to enable a piece of terminal equipment (which may be a mobile phone, a computer, server, network equipment or the like) to execute the method of each embodiment of the disclosure.

It is important to note that each module may be implemented through software or hardware, and the latter condition may be implemented in, but not limited to, the following manner: the modules are all positioned in the same processor, or, the modules are positioned in multiple processors respectively.

An embodiment of the disclosure further provides a storage medium. Optionally, in the embodiment, the storage medium may be configured to store a program codes configured to execute the method of the abovementioned embodiment.

Optionally, in the embodiment, the storage medium may include, but not limited to: various media capable of storing program codes such as a U disk, a ROM, a RAM, a mobile hard disk, a magnetic disk or an optical disk.

Optionally, in the embodiment, the processor executes the method of the abovementioned embodiment according to the program code stored in the storage medium.

Obviously, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

The technical solutions provided by the embodiments of the disclosure may be applied to a resource using process, and the transmission node dynamically changes the size of the resource corresponding to a current carrier according to the information detected on the current carrier, and performs data transmission through the changed carrier, so that the problem of low spectrum resource utilization rate is solved, and a spectrum utilization rate is increased.

The invention claimed is:

1. A resource use method, comprising:
dynamically changing, by a transmission node, a size of a resource corresponding to a current carrier according to information detected on the current carrier, and performing, by the transmission node, data transmission through the changed carrier,
wherein the detected information comprises a using condition of the resource corresponding to the current carrier, and the using condition of the resource comprises a using condition of an available resource of the current carrier, and the using condition of the resource comprises a condition that the resource is identified with a first granularity,
and wherein the current carrier is divided to obtain one or more basic system bandwidths according to the first granularity, and determine an available basic system bandwidth corresponding to the available resource,
each of the one or more basic system bandwidths corresponds to one or more second-granularity resources;
the one or more second-granularity resources correspond to two or more detection threshold values, and the detection threshold values are configured to detect whether the basic system bandwidth corresponding to the second-granularity resource is occupied,
wherein the detection threshold values comprise at least a first threshold value and a second threshold value, wherein the first threshold value is greater than the second threshold value, and the second threshold value is used to detect whether the basic system bandwidth corresponding to the second-granularity resource adjacent to the occupied basic system bandwidth is occupied;
determining a detection value corresponding to the occupied basic system bandwidth exceeds the first threshold value; and
dynamically changing, by the transmission node, the size of the resource corresponding to the current carrier according to the detection value.

2. The method according to claim 1, further comprising that:
different second-granularity resources correspond to a same detection threshold value or different detection threshold values, wherein a condition that different second-granularity resources correspond to different detection threshold values comprises that: a detection threshold value of a second-granularity resource adjacent to the occupied resource of the current carrier is different from a detection threshold value of a second-granularity resource not adjacent to the occupied resource.

3. The method according to claim 1, further comprising:
notifying position information of the resource corresponding to the current carrier to User Equipment (UE) through a signal,
the signal comprises at least one of: an occupation signal corresponding to the current carrier, a synchronization signal corresponding to the current carrier, a discovery signal corresponding to the current carrier and a starting position identification signal corresponding to the current carrier.

4. The method according to claim 1, further comprising
notifying position information of the resource corresponding to the current carrier to User Equipment (UE) through signaling,
the signaling is carried on a common channel of the current carrier; or, the signaling is carried on a physical downlink control channel of a common search space of a licensed carrier, and the licensed carrier is determined in a predefinition manner or a signaling indication manner.

5. The method according to claim 3, further comprising at least one of:
enabling a sequence corresponding to the signal to comprise at least one of: a pseudo-random Quadrature Phase Shift Keying (QPSK) symbol sequence, a Zadoff-Chu (ZC) sequence, a Walsh sequence and a pseudo-random Binary Phase Shift Keying (BPSK) sequence;
enabling the signal to be repeatedly transmitted on each basic system bandwidth, wherein the each basic system bandwidth is obtained by dividing the current carrier according to the first granularity, and the using condition of the resource is identified with the first granularity, or, a long sequence is generated according to a maximum bandwidth, and the sequence is correspondingly acquired from the long sequence according to a position of each basic system bandwidth;
enabling a frequency-domain position corresponding to the signal to be uniformly spaced or continuous; and
enabling the sequence and the frequency-domain position to be obtained according to a cell Identity (ID) or in a predefined manner.

6. The method according to claim 4, further comprising at least one of:
in a case that the signaling is carried on the physical downlink control channel of the common search space of the licensed carrier, transmitting multiple unlicensed carriers through a same physical downlink control channel corresponding to the signaling, the physical downlink control channel corresponding to a dedicated Radio Network Temporary Identifier (RNTI) and a dedicated Downlink Control Information (DCI) Format;
enabling the RNTI to be configured to identify the physical downlink control channel, enabling a bit number corresponding to the signaling to be determined according to an original system bandwidth, or, enabling the bit number to be fixedly q bits, q comprising one of: 4 and 2;
enabling a bit number of a DCI Format 6 corresponding to the signaling to be the same as a bit number corresponding to a DCI Format 1A and a DCI Format 1C, and positioned in the common search space;
enabling a starting position of the signaling in the DCI Format to be configured through high-layer signaling; and
enabling the common channel to be repeatedly transmitted on each basic system bandwidth, wherein the basic system bandwidth is obtained by dividing the current carrier according to the first granularity, and the using condition of the resource is identified with the first granularity.

7. The method according to claim 1, further comprising at least one of:
sending a full-bandwidth signal according to an available system bandwidth corresponding to the available resource of the current carrier;
sending the full-bandwidth signal according to the original system bandwidth corresponding to the current carrier; and
sending the full-bandwidth signal in a manner of repetition with the basic system bandwidth as a unit, wherein the full-bandwidth signal comprises at least one of: a discovery signal, a synchronization signal, a measurement signal and an occupation signal.

8. The method according to claim 1, further comprising at least one of:
when a scheduling manner corresponding to the current carrier is self-scheduling, determining a physical downlink control channel frequency-domain position according to the available resource of the current carrier, and transmitting DCI for carrying scheduling data corresponding to the current carrier according to the physical downlink control channel frequency-domain position; and
when the scheduling manner corresponding to the current carrier is self-scheduling, determining the physical downlink control channel frequency-domain position according to signaling, and transmitting the DCI for carrying the scheduling data corresponding to the current carrier according to the physical downlink control channel frequency-domain position, wherein the signaling is carried on the common channel of the current carrier, wherein the common channel is repeatedly transmitted on a frequency domain, each first granularity corresponds to one such common channel, and the using condition of the resource is identified with the first granularity, or, the signaling is carried on the physical downlink control channel of the common search space of the licensed carrier, and the licensed carrier is determined in a predefinition manner or a signaling indication manner.

9. The method according to claim 8, further comprising at least one of:
determining whether a preconfigured resource position is available according to the available resource of the current carrier, determining the physical downlink control channel frequency-domain position at a position of the available resource if the preconfigured resource position is available, and if the preconfigured resource position is not available, determining the physical downlink control channel frequency-domain position at a predefined resource position;

determining the physical downlink control channel frequency-domain position in combination with the pre-configured resource position according to a predefined offset manner; and determining the physical downlink control channel frequency-domain position at the predefined resource position according to the available resource of the current carrier.

10. The method according to claim 9, comprising at least one of:

enabling a predefined resource to comprise a predefined resource in a predefined basic system bandwidth corresponding to the available resource, wherein the predefined basic system bandwidth corresponding to the available resource comprises one of: a first available basic system bandwidth, a last available basic system bandwidth and an available system bandwidth with a lowest index value in system bandwidths closest to pre-configured resource position, wherein the predefined resource in the basic system bandwidth comprises at least one of:

a relative position of a preconfigured resource in the basic system bandwidth, n predefined continuous resource blocks, wherein n is a positive integer, and n predefined uniformly-spaced resource blocks, wherein n is a positive integer.

11. The method according to claim 10, wherein the relative position of the preconfigured resource in the basic system bandwidth is determined through a following manner: indicating the relative position in the basic system bandwidth through high-layer signaling, and selecting a basic system bandwidth according to a preset rule;

the n predefined continuous resource blocks comprise at least one of: first n continuous resource blocks, last n continuous resource blocks and middle n continuous resource blocks of a basic system bandwidth, wherein a starting resource block position of the n continuous resource blocks is determined according to the cell ID;

for the n predefined continuous resource blocks, n is a positive integer, the n predefined continuous resource blocks comprise at least one of: the first n continuous resource blocks, last n continuous resource blocks and middle n continuous resource blocks of the basic system bandwidth, and the starting resource block position of the n continuous resource blocks is determined according to the cell ID; and the n predefined uniformly-spaced resource blocks are determined through at least one of: selecting n resource blocks according to a maximum spacing of the basic system bandwidth, determining a starting position of the n resource blocks as a first resource block, determining the position of the starting resource block according to the cell ID and configuring the spacing through high-layer signaling.

12. The method according to claim 9, comprising at least one of:

determining the physical downlink control channel frequency-domain position in combination with the pre-configured resource position in the predefined offset manner comprises: upwards or downwards offsetting the preconfigured resource position according to h basic system bandwidths to obtain the position of the available resource in the available basic system bandwidth and determine the physical downlink control channel frequency-domain position, wherein h is a positive integer, and enabling the preconfigured resource position to be within a basic system bandwidth.

13. The method according to claim 8, further comprising:

discretely preconfiguring the physical downlink control channel frequency-domain position on each basic system bandwidth, the physical downlink control channel frequency-domain position being configured to transmit the DCI corresponding to current carrier, determining the preconfigured physical downlink control channel frequency-domain position according to the current available resource, and transmitting the DCI through the available resource.

14. The method according to claim 8, further comprising:

determining a bit number of a format of the DCI for the scheduling data according to the original system bandwidth, or, determining the bit number of the Format of the DCI according to the current available system bandwidth.

15. A resource use method, comprising:

determining, by User Equipment (UE), an available resource of a current carrier according to received signaling or signal, and detecting, by the User Equipment (UE), Downlink Control Information (DCI) and/or a full-bandwidth signal corresponding to the current carrier according to the available resource, wherein the current carrier is divided to obtain one or more basic system bandwidths according to the first granularity, each of the one or more basic system bandwidths corresponds to one or more second-granularity resources; and the one or more second-granularity resources correspond to two or more detection threshold values, and the detection threshold values are configured to detect whether the basic system bandwidth corresponding to the second-granularity resource is occupied, wherein the detection threshold values comprise at least a first threshold value and a second threshold value, wherein the first threshold value is greater than the second threshold value, and the second threshold value is used to detect whether the basic system bandwidth corresponding to the second-granularity resource adjacent to the occupied basic system bandwidth is occupied;

determining a detection value corresponding to the occupied basic system bandwidth exceeds the first threshold value; and receiving, by the User Equipment (UE), a data transmission through the available resource of the current carrier, wherein the size of the available resource of the current carrier is dynamically changing according to the detection value.

16. The method according to claim 15, wherein determining the available resource of the current carrier and detecting the DCI and/or full-bandwidth signal corresponding to the current carrier according to the available resource comprises:

determining an available basic system bandwidth of the current carrier according to the available resource;

determining, according to the available basic system bandwidth, a frequency-domain position for transmitting the DCI for data scheduling and corresponding to the current carrier;

detecting the DCI at the frequency-domain position, and performing data receiving or data transmission according to the detected DCI.

17. A resource use device, positioned in a transmission node and comprising:
a memory having stored thereon instructions: and
a processor configured to execute the instructions to dynamically change a size of a resource corresponding to a current carrier according to information detected on the current carrier; and
perform data transmission through the changed carrier,
wherein the detected information comprises a using condition of the resource corresponding to the current carrier, and the using condition of the resource comprises a using condition of an available resource of the current carrier, and the using condition of the resource comprises a condition that the resource is identified with a first granularity,
and wherein the current carrier is divided to obtain one or more basic system bandwidths according to the first granularity, and determine an available basic system bandwidth corresponding to the available resource,
each of the one or more basic system bandwidths corresponds to one or more second-granularity resources; and
the one or more second-granularity resources correspond to two or more detection threshold values, and the detection threshold values are configured to detect whether the basic system bandwidth corresponding to the second-granularity resource is occupied,
wherein the detection threshold values comprise at least a first threshold value and a second threshold value, wherein the first threshold value is greater than the second threshold value, and the second threshold value is used to detect whether the basic system bandwidth corresponding to the second-granularity resource adjacent to the occupied basic system bandwidth is occupied;
determine a detection value corresponding to the occupied basic system bandwidth exceeds the first threshold value; and
dynamically change the size of the resource corresponding to the current carrier according to the detection value.

18. The device according to claim 17, wherein the processor is further configured to:
notify position information of the resource corresponding to the current carrier to User Equipment (UE) through a signal or signaling.

19. The device according to claim 18, wherein the processor is further configured to at least one of:
sending a full-bandwidth signal according to an available system bandwidth corresponding to an available resource of the current carrier; or
sending the full-bandwidth signal according to an original system bandwidth corresponding to the current carrier,
wherein the full-bandwidth signal is sent in a manner of repetition with a basic system bandwidth as a unit, and
the full-bandwidth signal comprises at least one of: a discovery signal, a synchronization signal, a measurement signal and an occupation signal.

20. The device according to claim 17, wherein the processor is further configured to perform at least one of:
when a scheduling manner corresponding to the current carrier is self-scheduling, determining a frequency-domain position of a physical downlink control channel according to the available resource of the current carrier, and transmitting Downlink Control Information (DCI) carrying scheduling data corresponding to the current carrier according to the physical downlink control channel frequency-domain position; and
when the scheduling manner corresponding to the current carrier is self-scheduling, determining the physical downlink control channel frequency-domain position according to signaling, and transmitting the DCI carrying the scheduling data corresponding to the current carrier according to the physical downlink control channel frequency-domain position, wherein the signaling is carried on a common channel of the current carrier, wherein the common channel is repeatedly transmitted on a frequency domain, and each first granularity corresponds to one such common channel, or, the signaling is carried on the physical downlink control channel of a common search space of a licensed carrier, and the licensed carrier is determined in a predefinition manner or a signaling indication manner.

* * * * *